(12) United States Patent
Wang (10) Patent No.: US 11,440,116 B2
(45) Date of Patent: Sep. 13, 2022

(54) REFLOW OVEN WITH A ZEOLITE BOX, AND A METHOD FOR RECOVERING GAS WITH SUCH ZEOLITE BOX

(71) Applicant: Illinois Tool Works Inc., Glenview, IL (US)

(72) Inventor: Chuanbo Wang, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 93 days.

(21) Appl. No.: 16/640,153

(22) PCT Filed: Aug. 9, 2018

(86) PCT No.: PCT/US2018/045899
§ 371 (c)(1),
(2) Date: Feb. 19, 2020

(87) PCT Pub. No.: WO2019/040284
PCT Pub. Date: Feb. 28, 2019

(65) Prior Publication Data
US 2021/0078091 A1    Mar. 18, 2021

(30) Foreign Application Priority Data

Aug. 22, 2017    (CN) .......................... 201710726250.7
Aug. 22, 2017    (CN) .......................... 201721056520.X (51) Int. Cl.
| | | |
|---|---|---|
| *B23K 3/08* | (2006.01) | |
| *B23K 1/008* | (2006.01) | |
| *B23K 101/42* | (2006.01) | |
| *B23K 1/00* | (2006.01) | |
| *B23K 1/20* | (2006.01) | |

(52) U.S. Cl.
CPC ............... *B23K 1/008* (2013.01); *B23K 3/08* (2013.01); *B23K 1/0016* (2013.01); *B23K 1/203* (2013.01); *B23K 2101/42* (2018.08)

(58) Field of Classification Search
None
See application file for complete search history.

(56) References Cited

U.S. PATENT DOCUMENTS

| 5,472,135 A | 12/1995 | Taniguchi et al. |
|---|---|---|
| 5,715,990 A | 2/1998 | Taniguchi et al. |
| (Continued) | | |

FOREIGN PATENT DOCUMENTS

| CN | 101115357 A | 1/2008 |
|---|---|---|
| CN | 101522305 A | 9/2009 |
| (Continued) | | |

OTHER PUBLICATIONS

Notification of Transmittal of the International Search Report and the Written Opinion of the International Searching Authority from corresponding PCT/US2018/045899 dated Dec. 11, 2018.

*Primary Examiner* — Devang R Patel
(74) *Attorney, Agent, or Firm* — McAndrews, Held & Malloy, Ltd.

(57) ABSTRACT

The present application provides a reflow oven (100) and a gas recovery method. The reflow oven (100) comprises a reflow oven hearth (101), a separator (105), the separator inlet (110) being connected to the gas outlet (102) of the reflow oven hearth (101) so that the gases in the reflow oven hearth (101) can flow into the separator (105), a zeolite box (107), the zeolite box inlet (112) being connected to the separator outlet (111), and the zeolite box outlet (113) being connected to the gas inlet (103) of the reflow oven hearth (101) so that the gases flowing through the separator (105) can enter the zeolite box (107) and the gases flowing through the zeolite box (107) can flow out of the zeolite box outlet (113), a sensor (106), which is provided in the gas passage between said zeolite box outlet (113) and the gas inlet (103) of the reflow oven hearth (101). The reflow oven (100) in the present application enables the gases flowing through the (Continued)

separator (105) to enter the zeolite box (107). After most of the flux is removed from the gases in the separator (105), the flux is further removed in the zeolite box (107). In addition, polygonal zeolites have certain volumes and are supported in the zeolite box (107) to form clearances, and thus almost no resistance is brought about to the flow of the gases in the zeolite box (107).

<p align="center">6 Claims, 5 Drawing Sheets</p>

(56) <p align="center">References Cited</p>

<p align="center">U.S. PATENT DOCUMENTS</p>

| | | | |
|---|---|---|---|
| 8,883,667 | B2 | 11/2014 | Nakano et al. |
| 9,539,672 | B2 * | 1/2017 | Rodrigues .............. B23K 1/012 |
| 2002/0061490 | A1 * | 5/2002 | Yamaoka ................ B23K 1/008 |
| | | | 432/152 |
| 2007/0284408 | A1 * | 12/2007 | Asai ....................... B23K 1/008 |
| | | | 228/42 |
| 2008/0295686 | A1 * | 12/2008 | Neiderman ............ B23K 1/008 |
| | | | 95/39 |
| 2009/0324454 | A1 | 12/2009 | Nakano et al. |
| 2018/0333796 | A1 * | 11/2018 | Diepstraten .......... B23K 1/0016 |

<p align="center">FOREIGN PATENT DOCUMENTS</p>

| | | | | |
|---|---|---|---|---|
| CN | 103801780 | A | | 5/2014 |
| CN | 106695048 | A | | 5/2017 |
| CN | 207289104 | U | | 5/2018 |
| JP | 06097645 | A * | 4/1994 | ............ H05K 3/034 |
| JP | H07159297 | A | | 6/1995 |

* cited by examiner

REFLOW OVEN WITH A ZEOLITE BOX, AND A METHOD FOR RECOVERING GAS WITH SUCH ZEOLITE BOX

CROSS-REFERENCE TO RELATED APPLICATIONS

This application is a U.S. National Phase Application under 35 U.S.C. § 371 of International Application No. PCT/US2018/045899, filed Aug. 9, 2018, which claims priority to Chinese Application No. 201710726250.7, filed Aug. 22, 2017 and Chinese Application No. 201721056520.X, filed Aug. 22, 2017. Each application referenced above is hereby incorporated by reference in its entirety for all purposes.

TECHNICAL FIELD

The present application belongs to the technical field of reflow soldering, and in particular relates to a reflow oven and a gas recovery method.

BACKGROUND ART

Surface mounting of electronic products is usually completed by means of the reflow soldering technology. The reflow soldering technology means that after the working gas in the reflow oven hearth is heated to a high enough temperature, it is blown to a component-mounted printed circuit board (PCB) so that the solder used for the components is bonded to the PCB after being melted. For a reflow oven where nitrogen or other inert gases are used as a working gas, when the PCB is put into or removed from the reflow oven hearth, ambient air will inevitably enter the hearth, and thus nitrogen in the hearth will be mixed up with a certain amount of oxygen. To guarantee the quality of reflow soldering, it is necessary to control the ratio of oxygen to nitrogen in the reflow oven hearth below a certain value, for example, 8/10000. Therefore, it is necessary to continuously input a lot of nitrogen to maintain the ratio of oxygen, resulting in too high a cost.

For this reason, a separator connected to the reflow oven hearth is provided in the reflow oven of the prior art so that after the gases are output from the reflow oven hearth, the flux is removed by the separator from the gases, and then the gases are sent back to the hearth for recovery. An oxygen content detecting sensor is mounted between the output end of the separator and the hearth, the result of the oxygen content in the flux-removed gases is obtained through the oxygen content detecting sensor, and the amount of nitrogen input into the hearth can be controlled according to the result so that the ratio of the oxygen content to the nitrogen content in the reflow oven hearth can be kept within the preset range.

SUMMARY OF THE INVENTION

After long-term tests and observations, the applicant finds that when the reflow oven of the prior art is used, the quality of soldered products is sometimes unsteady because the ratios of the gases in the reflow oven hearth are not steadily kept within the preset range. After detections, the applicant finds that it is very difficult to completely remove the flux from the gases by means of the separation process of the separator of the prior art, and a trace of flux is apt to condense at the detection end of the sensor, resulting in an incorrect reading or even a sensor failure if the sensor works a long time. Thus, the ratio of nitrogen cannot effectively be controlled.

If a filter device is simply added to the lower side of the separator, the flow resistance of gases in the filtering passage will increase, resulting in other problems.

To solve the above-mentioned problems, at least one objective of the present application is to provide such a reflow oven that the ratios of the gases in the reflow oven hearth are steady and the components in the residual flux passing through the separator are improved, and thus the sensor is protected.

To achieve the above-mentioned objective, the first aspect of the present application provides a reflow oven. Said reflow oven comprises a reflow oven hearth. Said reflow oven hearth comprises a gas outlet and a gas inlet. Said reflow oven further comprises a separator, said separator comprising a separator inlet and a separator outlet, and said separator inlet being connected to said gas outlet of said reflow oven hearth so that the gases in said reflow oven hearth can flow into said separator, and a zeolite box, said zeolite box comprising a zeolite box inlet and a zeolite box outlet, said zeolite box inlet being connected to said separator outlet, and said zeolite box outlet being connected to said gas inlet of said reflow oven hearth so that the gases flowing through said separator can enter said zeolite box and the gases flowing through said zeolite box can flow from said zeolite box outlet back to said reflow oven hearth.

According the above-mentioned first aspect, said reflow oven further comprises a sensor, said sensor being provided in the gas passage between said zeolite box outlet and said gas inlet of said reflow oven hearth.

According to the above-mentioned first aspect, a nitrogen inlet is provided on said reflow oven hearth, said reflow oven further comprises a nitrogen regulating valve, said nitrogen regulating valve being connected to said nitrogen inlet and being used to regulate the amount of input nitrogen, and a control device, said control device (120) receiving a detection signal from said sensor and controlling said nitrogen regulating valve according to the detection signal of said sensor.

According to the above-mentioned first aspect, said zeolite box comprises a box body, said box body having a chamber and an opening, an inner net cage, said inner net cage being detachably mounted in said chamber through said opening, gas openings being provided in at least two side walls, said inner net cage being used to accommodate a plurality of zeolites, and said gas openings having such a size that they can block said plurality of zeolites, and a box cover, said box cover sealing said opening.

According to the above-mentioned first aspect, said zeolite is in the shape of a polygon so that there is a clearance between said plurality of zeolites.

According to the above-mentioned first aspect, the average particle size of said plurality of zeolites is above 2 cm.

According to the above-mentioned first aspect, said at least two side walls of said inner net cage are perforated plates.

The second aspect of the present application provides a gas recovery method for a reflow oven. The reflow oven hearth of said reflow oven comprises a gas outlet and a gas inlet. Said gas recovery method comprises the following steps: enabling the gases output from the gas outlet of the reflow oven hearth to flow through the separator and the zeolite box in turn so that the flux is removed from the gases, enabling the gases to flow through the sensor so as to detect the concentration of oxygen in the gases, and finally enabling the gases to flow from the gas inlet of the reflow oven hearth back to the reflow oven hearth and controlling the amount of nitrogen input into said reflow oven hearth according to the oxygen concentration detected by the sensor.

According to the above-mentioned second aspect, the pressure of the gases flowing through said zeolite box is 1 kPa to 2 kPa.

According to the above-mentioned second aspect, the velocity of the gases flowing through said zeolite box is above 15 m$^3$/h.

The reflow oven in the present application enables the gases flowing out of the separator to flow into the zeolite box, most of the flux is removed from the gases in the separator, the residual flux is further removed through the zeolite box, and thus the sensor connected to the zeolite box outlet is protected. A plurality of zeolites are filled in the zeolite box in the present application. Since fine cavities and passages are filled in each zeolite, zeolites have a remarkable effect on the removal of the remaining low-content flux component from the gases where most of the flux has been removed by the separator. In addition, polygonal zeolites have certain volumes and are supported in the zeolite box to form clearances, and thus almost no resistance is brought about to the flow of the gases in the zeolite box. The chamber of the zeolite box has an inner net cage. The inner net cage can not only contain and block zeolites, but also facilitate the replacement of zeolites. In addition, the amount of nitrogen input into the oven hearth is controlled according to the detection result of the oxygen content detecting sensor so that the ratios of the gases in the oven hearth are steady.

DETAILED DESCRIPTION OF THE INVENTION

The following will describe various specific implementation modes of the present application by reference to the drawings which constitute a part of the present description. It should be understood that although the terms indicating directions, such as "before", "behind", "on", "below", "left", and "right" are used to describe various exemplified structural parts and components in the present application, these terms are just used for the convenience of illustrations and are determined based on the exemplified directions in the drawings. Since the embodiments disclosed in the present application can be set in different directions, these terms indicating directions are only used as illustrations, instead of restrictions. Where possible, the same or similar reference number used in the present application refers to the same component.

When reflow soldering is performed for a PCB in a reflow oven, the high-temperature environment will evaporate the flux into a gas and it will be mixed with other gases. The gases containing the flux component flow out of the gas outlet on the reflow oven hearth, the flux component is removed by the separator, and then the gases flow from the gas inlet on the reflow oven hearth back to the reflow oven hearth to complete gas recovery. Said other gases can be the air, or a specific inert gas, or a mixture of inert gases in the reflow oven. Said other gases in the reflow oven in the present application refer to a mixture of nitrogen and oxygen at a certain ratio.

The flow of the gases is realized by use of the negative pressure produced by the fan (not shown in the figures) in the reflow oven. In the reflow oven of the prior art, the fan has usually already existed in the reflow oven. When the negative pressure is not large enough to help the gases to complete circulations, an additional fan or electric motor can be used to increase the power for the flow of the gases.

Figure 1:
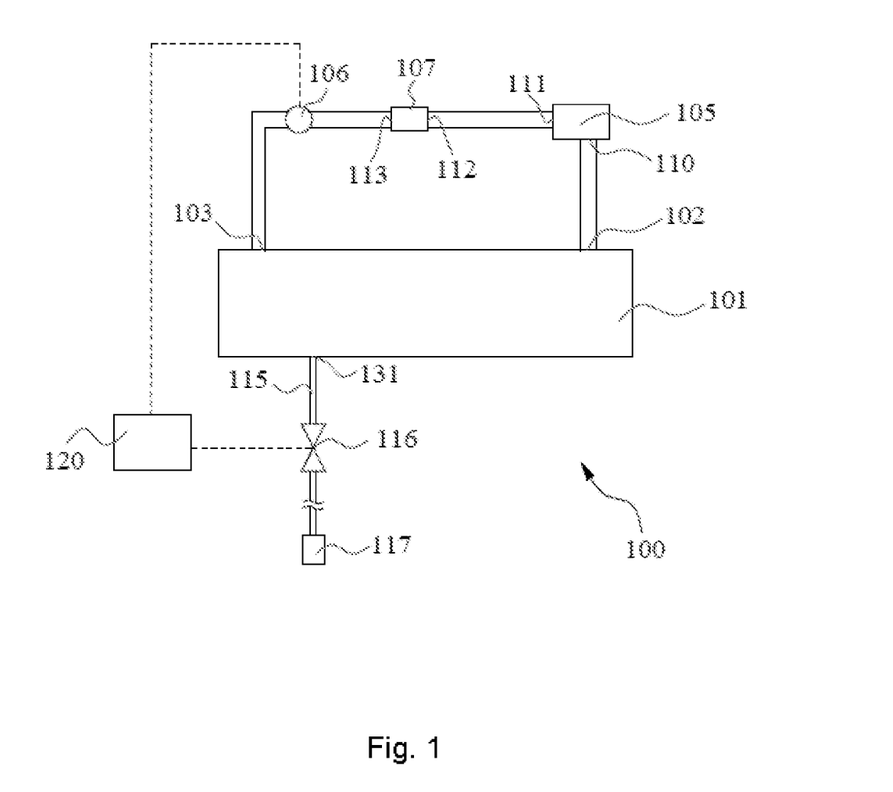
FIG. 1 is a block diagram for the connections of the components of the reflow oven in the present application.

FIG. 1 is a block diagram for the connections of the components of the reflow oven (100) in the present application. As shown in FIG. 1, the reflow oven in the present application comprises a reflow oven hearth (101), a separator (105), a zeolite box (107) and a sensor (106). A gas outlet (102) and a gas inlet (103) are provided on the reflow oven hearth (101).

By connecting the gas outlet (102) to the separator inlet (110) of the separator (105) with a gas pipeline, the gases containing the flux can flow from the gas outlet (102) into the separator (105) and most of the flux can be removed by the separator (105). The separator (105) further has a separator outlet (111). By connecting the separator outlet (111) to the zeolite box inlet (112) of the zeolite box (107) with a gas pipeline, the gases flowing through the separator (105) flow into the zeolite box (107) and then flow out of the zeolite box outlet (113) of the zeolite box (107). The residual flux in the gases is removed by the zeolite box (107). The sensor (106) is provided in the gas pipeline between the zeolite box outlet (113) and the gas inlet (103) of the reflow oven hearth. In this way, after the gases in which the flux is completely removed flow out of the zeolite box outlet (113), the oxygen concentration in the gases is first detected by the sensor (106) and a detection signal is obtained. After that, the gases are transported to the reflow oven hearth (101) via the gas inlet (103). Said gas pipeline can equally be replaced with another type of duct or a similar passage.

Still as shown in FIG. 1, the reflow oven (100) further comprises a nitrogen regulating passage (115), a nitrogen regulating valve (116) and a control device (120). With one end of the nitrogen regulating passage (115) connected to the nitrogen inlet (131) on the reflow oven hearth (101) and the other end connected to a nitrogen source (117), the nitrogen regulating passage (115) is used to supply nitrogen to the reflow oven hearth (101). The nitrogen regulating valve (116) is located in the nitrogen regulating passage (115), and the control device (120) controls the nitrogen regulating valve (116) so as to control the amount of nitrogen supplied to the reflow oven hearth (101). The control device (120) receives a detection signal indicating the oxygen concentration from the sensor (106), and determines according to the detection signal whether a proper amount of nitrogen needs to be supplied to the reflow oven hearth (101) so as to guarantee that the preset ratio of nitrogen to oxygen in the reflow oven hearth (101) is maintained.

The working process of the reflow oven (100) in the present application is as follows: After soldering starts in the reflow oven, the flux vapors produced are mixed with nitrogen and oxygen to form gases containing the flux component, the gases flow out of the gas outlet (102), most of the flux is removed by use of the separation process in the separator (105), the remaining flux is further removed by use of the flowing filtering process in the zeolite box (107), and finally the gases return to the reflow oven hearth (101) via the gas inlet (103) to continue participating in soldering in the reflow oven. In addition, before the gases return to the gas inlet (103), the oxygen concentration in the gases is first detected by the sensor (106), and the control device (120) regulates the nitrogen regulating valve (116) according to the detection result to control the amount of nitrogen supplied from the nitrogen source (117) to the reflow oven hearth (101) to maintain the ratio of nitrogen to oxygen in the reflow oven hearth (101) and guarantee the soldering effect during soldering.

Different separation processes, for example, flux condensation or flux decomposition, can be used in the above-mentioned separator (105) to remove the flux, and the effect of the present application will not be influenced. In one example, flux decomposition is used in the separator (105) in the present application to remove the flux, and thus the gases flowing out of the separator (105) after separation contain only a low-content flux. In one example, the content of the residual flux in the gases flowing out of the separator (105) after separation is 10%, and only a trace of residual flux or no residual flux can be detected in the gases flowing out of the zeolite box (107) after filtering.

Figure 2:
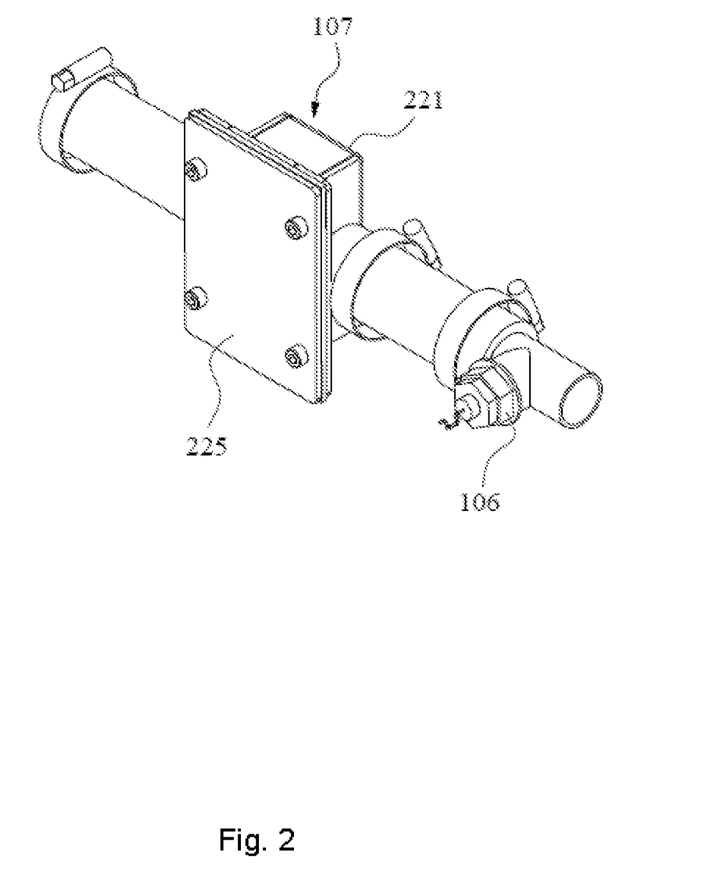
FIG. 2 shows the partial structure of the reflow oven comprising a zeolite box in the present application.

FIG. 2 shows the specific structure of the zeolite box (107) in the present application. As shown in FIG. 2, the zeolite box inlet (112) (shown in FIG. 5) of the zeolite box (107) is used to connect to the separator outlet (111) (not shown in the figure, see FIG. 1) with a gas pipeline, and the zeolite box outlet (113) (shown in FIG. 5) of the zeolite box (107) is connected to the sensor (106). The zeolite box (107) comprises a box body (221), a box cover (225), and an inner net cage (323) (shown in FIG. 3) accommodated in the box body (221).

Figure 3:
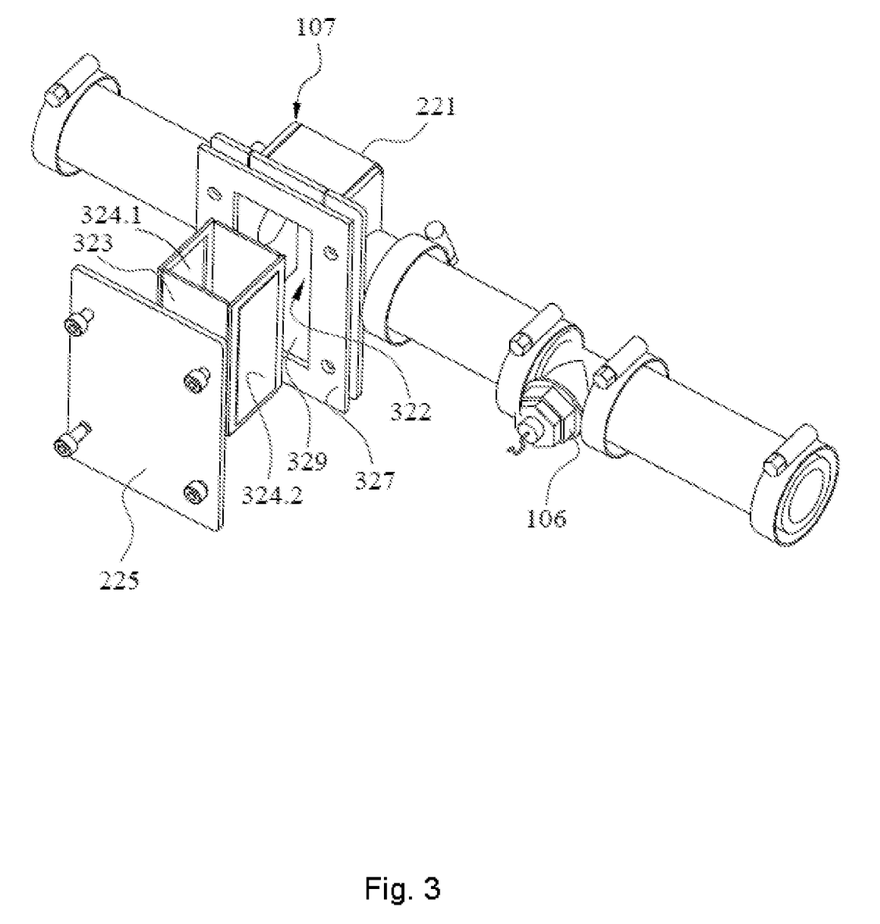
FIG. 3 is an exploded partial view of the reflow oven in FIG. 2 and is used to show more detailed component structures of the zeolite box.
Figure 5:
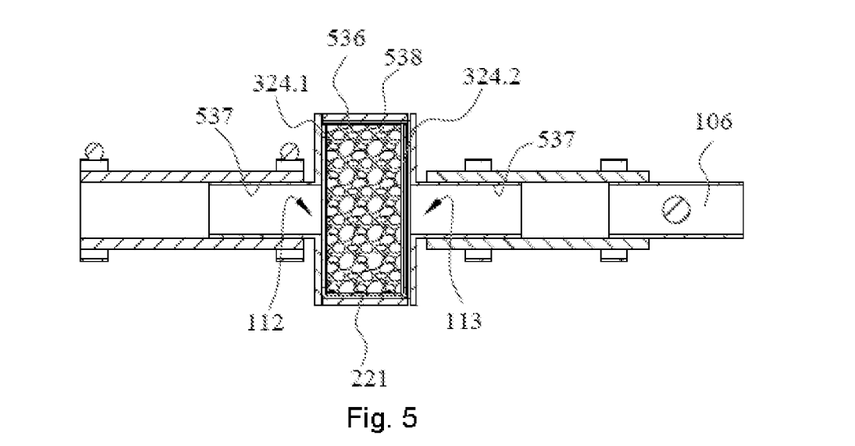
FIG. 5 is a cutaway view in the A-A direction in FIG. 4 and is used to show more detailed internal installation structures of the zeolite box.

To show the more detailed inner structure of the zeolite box (107), FIG. 3 shows an exploded partial view of the zeolite box (107) in FIG. 2. As shown in FIG. 3, the box body (221) has a chamber (322) used to accommodate the inner net cage (323). The inner net cage (323) can contain zeolites (538) (as shown in FIG. 5). When it is necessary to replace zeolites (538) in the zeolite box (107), it can conveniently be done by removing the inner net cage (323). The specific structures of said inner net cage (323) will be described in detail later in this document. The box body (221) has an opening (329) on one side so that the inner net cage (323) can be assembled or removed through the opening (329). The box cover (225) is used to seal the opening (329). To achieve a better sealing effect, a sealing gasket (327) is provided between the box body (221) and the box cover (225).

Figure 4:
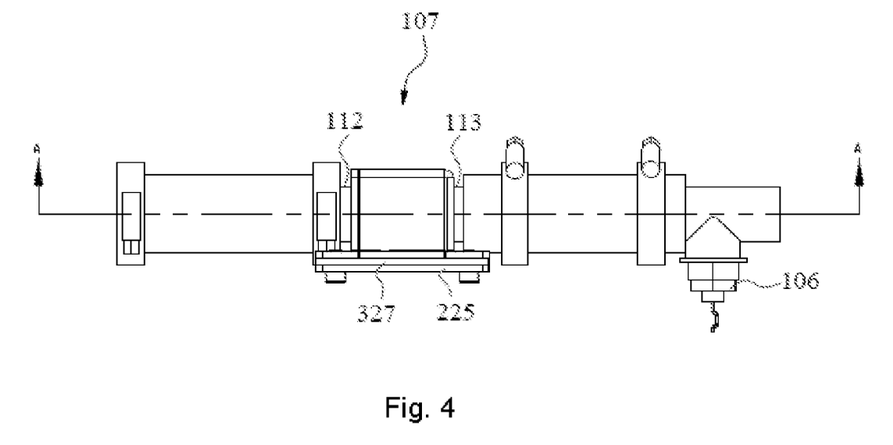
FIG. 4 is a top view of the reflow oven in FIG. 2 and is used to show more detailed external installation structures of the zeolite box.

FIG. 4 is a top view of the reflow oven in FIG. 2 and is used to show more detailed external installation structures of the zeolite box. FIG. 5 is a cutaway view in the A-A direction in FIG. 4 and is used to show more detailed internal installation structures of the zeolite box and show more clearly the zeolite box inlet (112) and the zeolite box outlet (113) of the zeolite box (107). As shown in FIG. 4 and FIG. 5, a sleeve (537) is provided at the zeolite box inlet (112) and the zeolite box outlet (113), respectively. Through the sleeves (537), the zeolite box inlet (112) and the zeolite box outlet (113) can be sleeved in the gas pipeline and the sleeved positions can be fastened by use of a clasp or a clamp. Through the above-mentioned settings, the gases can be sealed more tightly when they flow from the separator outlet (111) to the zeolite box (107) and from the zeolite box (107) to the sensor (106).

As shown in FIG. 5, said zeolites (538) in the present application can be particles in the shape of a polygon, and a clearance (536) is formed between the particles to allow the gases to flow through when a plurality of particle zeolites (538) in the shape of a polygon are piled up together. The clearance (536) should be as large as possible so that the gases can encounter a small resistance when they flow through the zeolite box (107). For example, the average particle size of zeolites (538) is 2 cm or so and zeolites (538) in such a size can cooperate with the inner net cage (323) to let the pressure of the gases flowing through the zeolite box (107) reach 1 kPa to 2 kPa and the velocity reach 15 $m^3$/h. In the embodiments of the present application, when the flowing pressure of the gases is 1 kPa to 2 kPa and the flowing velocity is above 15 $m^3$/h, no additional fan or electric motor is required during the circulation of the gases, and the circulation of the gases can be realized by means of the negative pressure provided by the fan (not shown) in the reflow oven. Meanwhile, fine cavities and passages are filled in the particles of zeolites (538) and the zeolites have a remarkable effect on the purification of the gases which flow out the separator (105) and contain a low-content flux.

Still as shown in FIG. 5, the inner net cage (323) is filled with zeolites (538). To let the gases flow through the inner net cage (323) and enter the piles of zeolites (538), a series of gas openings are provided in at least two side walls (324.1 and 324.2) of the inner net cage (323) in the directions of the zeolite box inlet (112) and the zeolite box outlet (113) so that the gases can flow through the side walls (324.1 and 324.2). However, said gas openings should be in such a size that they allow the gases to flow through but prevent zeolites (538) from passing. In this way, zeolites (538) can be held in the inner net cage (323).

Figure 6A:
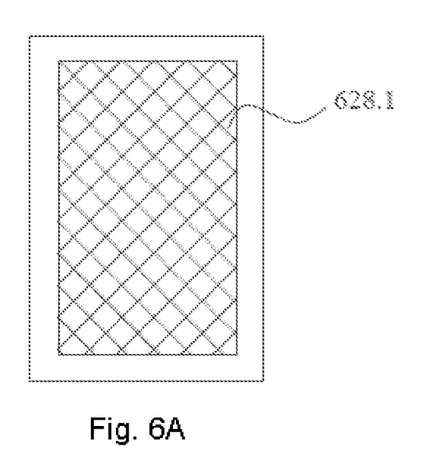
FIG. 6A shows the structure of the side wall of the inner net cage in one embodiment of the present application.
Figure 6B:
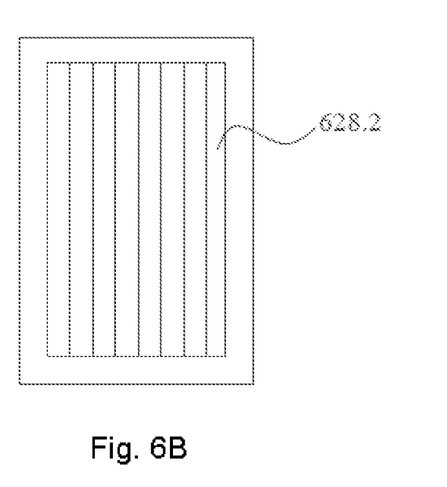
FIG. 6B shows the structure of the side wall of the inner net cage in another embodiment of the present application.

FIG. 6A and FIG. 6B show two embodiments of side walls (324.1 and 324.2). As shown in FIG. 6A, side walls (324.1 and 324.2) are perforated plates, which have gas openings (628.1). As shown in FIG. 6B, side walls (324.1 and 324.2) are grid plates, which have gas openings (628.2).

As mentioned above, said gas openings (628.1 or 628.2) allow the gases to pass but prevent zeolites (538) from passing. Therefore, the size of said gas openings (628.1 or 628.2) should be determined according to the size of zeolites. To be specific, the side walls (324.1 and 324.2) of the inner net cage (323) should have gas openings (628.1 or 628.2) as large as possible to minimize the resistance brought about by the inner net cage (323) to the flowing gases, and meanwhile, too large gas openings (628.1 or 628.2) should be prevented for fear that zeolites (538) can leak out of the gas openings (628.1 or 628.2). Gas openings can be provided only in the side walls (324.1 and 324.2) in the gas-flowing direction. However, gas openings can also be provided on the four side walls of the inner net cage (323) as long as the gas openings are in such a size that they can prevent zeolites (538) from passing.

In the present application, after the decomposition process is used in the separator (105) to remove most of the flux, the remaining flux is removed by use of the flowing filtering process in the zeolite box (107). This is an optimized solution and structure for removing the remaining flux from the air, or specific inert gas, or a mixture of inert gases (for example, nitrogen and oxygen) in the reflow oven.

Although the reflow oven where nitrogen is used as a working gas is illustrated in the present application, in practice, the illustration applies to the reflow oven where other inert gases are used as working gases.

Although the present application is described by reference to the specific implementation modes shown in the drawings, it should be understood that the reflow oven in the present application can have many variants, without departing from the spirit, scope and background of the present application. Those skilled in the art should also realize that different changes to the structural details in the embodiments disclosed in the present application should all fall within the spirit and scope of the present application and the claims.

The invention claimed is:

1. A reflow oven, comprising:
    a reflow oven hearth comprising a gas outlet and a gas inlet;
    a separator comprising a separator inlet and a separator outlet, the separator inlet being connected to the gas outlet of the reflow oven hearth so that the gases in said reflow oven hearth can flow into the separator; and
    a zeolite box comprising a zeolite box inlet and a zeolite box outlet, the zeolite box inlet being connected to the separator outlet, and the zeolite box outlet being connected to the gas inlet of the reflow oven hearth so that the gases flowing through the separator can enter the zeolite box and the gases flowing through the zeolite box can flow from the zeolite box outlet back to the reflow oven hearth, wherein the zeolite box comprises:
    a box body having a chamber and an opening;
    an inner net cage detachably mounted in the chamber through the opening, gas openings being provided in at least two side walls of the inner net cage, the inner net cage being used to accommodate a plurality of zeolites, and the gas openings having such a size that the gas openings can block the plurality of zeolites; and
    a box cover sealing said opening.

2. The reflow oven as claimed in claim 1, wherein the reflow oven further comprises:
    a sensor provided positioned in the gas passage between the zeolite box outlet and the gas inlet of said reflow oven hearth.

3. The reflow oven as claimed in claim 2, further comprising a nitrogen inlet on the reflow oven hearth, and the reflow oven further comprises:
    a nitrogen regulating valve connected to the nitrogen inlet and being used to regulate the amount of input nitrogen, and
    a control device configured to:
    receive a detection signal from the sensor; and
    control the nitrogen regulating valve based on the detection signal of the sensor.

4. The reflow oven as claimed in claim 1, wherein the zeolite is in the shape of a polygon so that there is a clearance between said plurality of zeolites.

5. The reflow oven as claimed in claim 4, wherein the average particle size of said plurality of zeolites is above 2 cm.

6. The reflow oven as claimed in claim 1, wherein the at least two side walls of said inner net cage are perforated plates.

* * * * *